United States Patent
Tran et al.

(10) Patent No.: US 10,634,808 B2
(45) Date of Patent: Apr. 28, 2020

(54) SWITCHABLE MULTI-ANTENNA FLUID SENSING

(71) Applicant: Halliburton Energy Services, Inc., Houston, TX (US)

(72) Inventors: Thanh T. Tran, Houston, TX (US); Kris Ravi, Kingwood, TX (US); Yousef H Alaas, Houston, TX (US); William J. Schaecher, Houston, TX (US); Ariful I Bhuiyan, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 109 days.

(21) Appl. No.: 15/766,977

(22) PCT Filed: Nov. 23, 2015

(86) PCT No.: PCT/US2015/062101
§ 371 (c)(1),
(2) Date: Apr. 9, 2018

(87) PCT Pub. No.: WO2017/091193
PCT Pub. Date: Jun. 1, 2017

(65) Prior Publication Data
US 2018/0292559 A1    Oct. 11, 2018

(51) Int. Cl.
*G01V 3/26* (2006.01)
*E21B 47/00* (2012.01)
(Continued)

(52) U.S. Cl.
CPC .............. *G01V 3/26* (2013.01); *E21B 17/028* (2013.01); *E21B 33/14* (2013.01);
(Continued)

(58) Field of Classification Search
CPC .................................. G01V 3/26; G01V 3/30
See application file for complete search history.

(56) References Cited

U.S. PATENT DOCUMENTS

| 5,485,743 A * | 1/1996 | Taherian ................ G01N 22/00 73/61.44 |
| 6,373,254 B1 | 4/2002 | Dion et al. |

(Continued)

OTHER PUBLICATIONS

International Search Report and Written Opinion for PCT/US2015/062101 dated Aug. 23, 2016.

*Primary Examiner* — Walter L Lindsay, Jr.
*Assistant Examiner* — Milton Gonzalez
(74) *Attorney, Agent, or Firm* — Thomas Rooney; C. Tumey Law Group PLLC

(57) ABSTRACT

Switchable multi-antenna fluid sensing systems and methods, including a tubular-mounted switchable multi-antenna fluid sensing system that includes two antenna arrays that each senses fluid characteristics not sensed by other antenna arrays, each array including multiple antenna sub-arrays and each sub-array including a receive and transmit antenna with a radial transmission direction different from that of other sub-arrays. The system also includes two RF multiplexers, each coupled to the antennas within the arrays and to corresponding RF transceivers within a sensor tube. A CPU within the sensor tube couples to the RF transceivers, controls signal transmission by, and processes received signals from, the antennas. RF cables coupling the RF transceivers and RF multiplexers are grouped and routed through one end of the sensor tube. The CPU further causes the RF multiplexers to periodically couple to the antennas and stores and/or transmits data representing the received signals.

20 Claims, 5 Drawing Sheets

(51) Int. Cl.
   *E21B 17/02* (2006.01)
   *E21B 33/14* (2006.01)
   *E21B 47/12* (2012.01)
   *H01Q 1/52* (2006.01)

(52) U.S. Cl.
   CPC ........ *E21B 47/0005* (2013.01); *E21B 47/122* (2013.01); *H01Q 1/523* (2013.01)

(56) References Cited

U.S. PATENT DOCUMENTS

| | | |
|---|---|---|
| 2004/0263175 A1 | 12/2004 | Chouzenoux et al. |
| 2008/0158005 A1 | 7/2008 | Santoso et al. |
| 2012/0143529 A1 | 7/2012 | Dam |
| 2013/0118752 A1 | 5/2013 | Hannegan et al. |
| 2014/0354443 A1 | 12/2014 | Roberson et al. |
| 2015/0218941 A1 * | 8/2015 | Clarke .................. E21B 49/08 324/324 |

* cited by examiner

FIG. 5
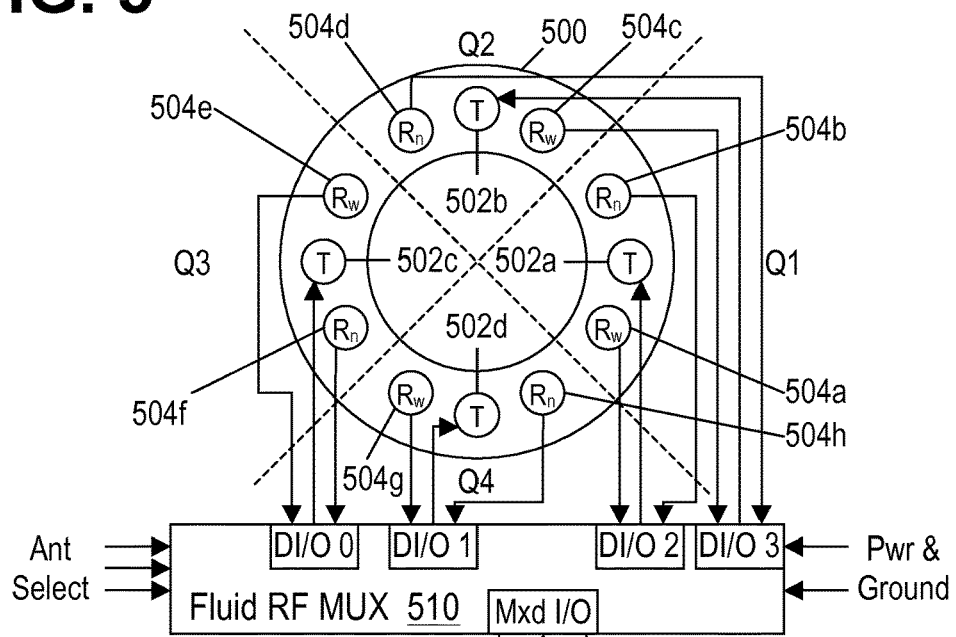
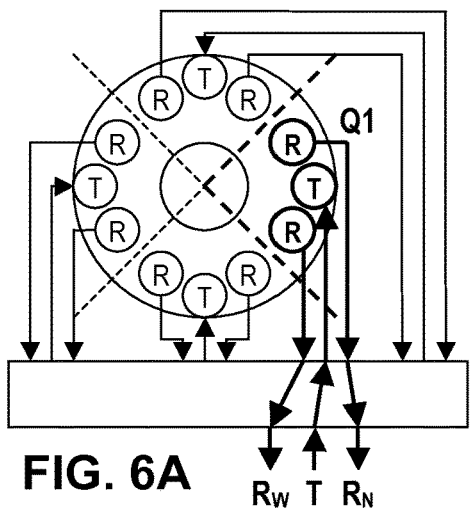
FIG. 6A
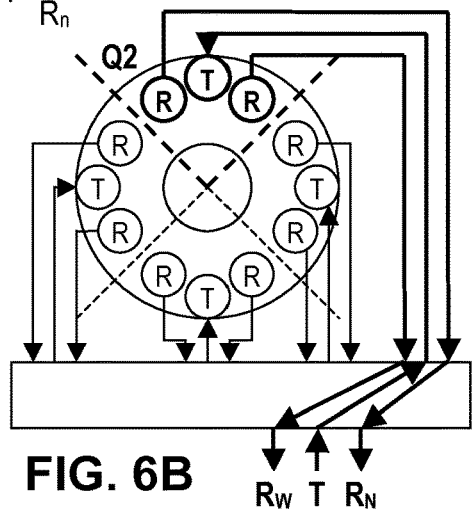
FIG. 6B
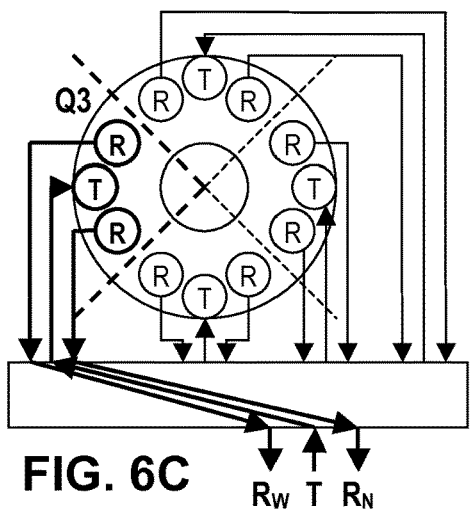
FIG. 6C
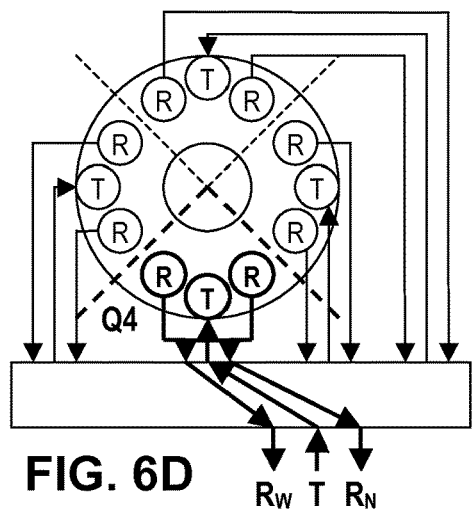
FIG. 6D

SWITCHABLE MULTI-ANTENNA FLUID SENSING

BACKGROUND

As wells are drilled to greater lengths and depths, it becomes necessary to provide a liner ("casing") to avoid undesirable fluid inflows or outflows and to prevent borehole collapse. The annular space between the borehole wall and the liner is usually filled with cement (a process referred to as "cementing" the well) to reinforce structural integrity and to prevent fluid flows along the outside of the liner. If such fluid flows are not prevented, there is a loss of zonal isolation. Fluids from high-pressured formations can enter the borehole and travel along the outside of the casing to invade lower-pressured formations, or possibly exit the borehole in a mixture that dilutes the desired production fluid. Results may include contamination of aquifers, damage to the hydrocarbon reservoir, and loss of well profitability.

When cementing a well, the cement is generally injected down the interior of the casing to the bottom of the borehole and forced back upward around the casing. Spacer fluids are first injected into the casing ahead of the cement to separate, and thus reduce contact and mixing between, wellbore fluids (e.g., drilling fluid and cement). After spacer fluid is pumped in, the cement is pumped into the casing. This forces fluid already in the borehole (e.g., spacer and drilling fluid) back up into the annular region between the casing and the formation and to the surface where it is safely collected. Once the desired amount of cement has been injected into the casing, spacer fluid is again injected to force the cement out of the casing, out into the bottom of the borehole and back up the annular region outside the casing. The spacer fluid continues to be injected downward until all of the cement is forced out of the bottom end of the casing. The cement outside the casing is then left to cure before any further drilling or production activities continue.

As cementing proceeds it is useful to monitor the characteristics and flow of the cement as it is introduced into the annular region outside the casing. A number of electromagnetic techniques may be used to monitor such fluid characteristics as composition, density and thickness, just to name a few. Further, radio frequency identification (RFID) tags entrained in the fluids (cement, spacer fluids, etc.) can be used to track the flow rate, flow direction and location of the fluids within the borehole. However, different measurement and tracking techniques may each require different sets of antennas positioned on the exterior surface of the casing. Further, each set of antennas sometimes requires multiple antennas, each with a corresponding RF coaxial cable that connects the antenna to the electronics driving, receiving and processing antenna signals. These electronics are typically encased in a protective housing or "sensor tube" that shields the electronics from the harsh environment present downhole. But as the number of antennas increases, so does the number of cables entering/exiting the sensor tube, requiring an increase in the diameter of the tube to the point where the tube may undesirably interfere with the cement flow. Such interference can result in voids in the cement and/or a reduced cement thickness that may compromise the long-term strength and integrity of the cement after it cures.

BRIEF DESCRIPTION OF THE DRAWINGS

Accordingly, there are disclosed herein methods and systems for switchable multi-antenna fluid sensing. In the drawings:

FIG. 5 shows an illustrative fluid antenna switch and array configuration.

FIGS. 6A-6D show an illustrative fluid antenna array switching sequence.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe illustrative systems and methods for switchable multi-antenna fluid sensing. Illustrative production environments are first described, followed by a description of the electronics used to control the system and process data from the various illustrative antenna arrays that provide at least part of the desired fluid sensing. Examples of several antenna array configurations are then disclosed, together with illustrative multiplexing schemes that provide a reduction in the number of RF conductors routed through the end of a sensor tubing that houses and protects the system's downhole electronics. Finally, an illustrative switchable multi-antenna fluid sensing method for controlling the multiplexing and operating the system is presented.

Figures 1, 1A:
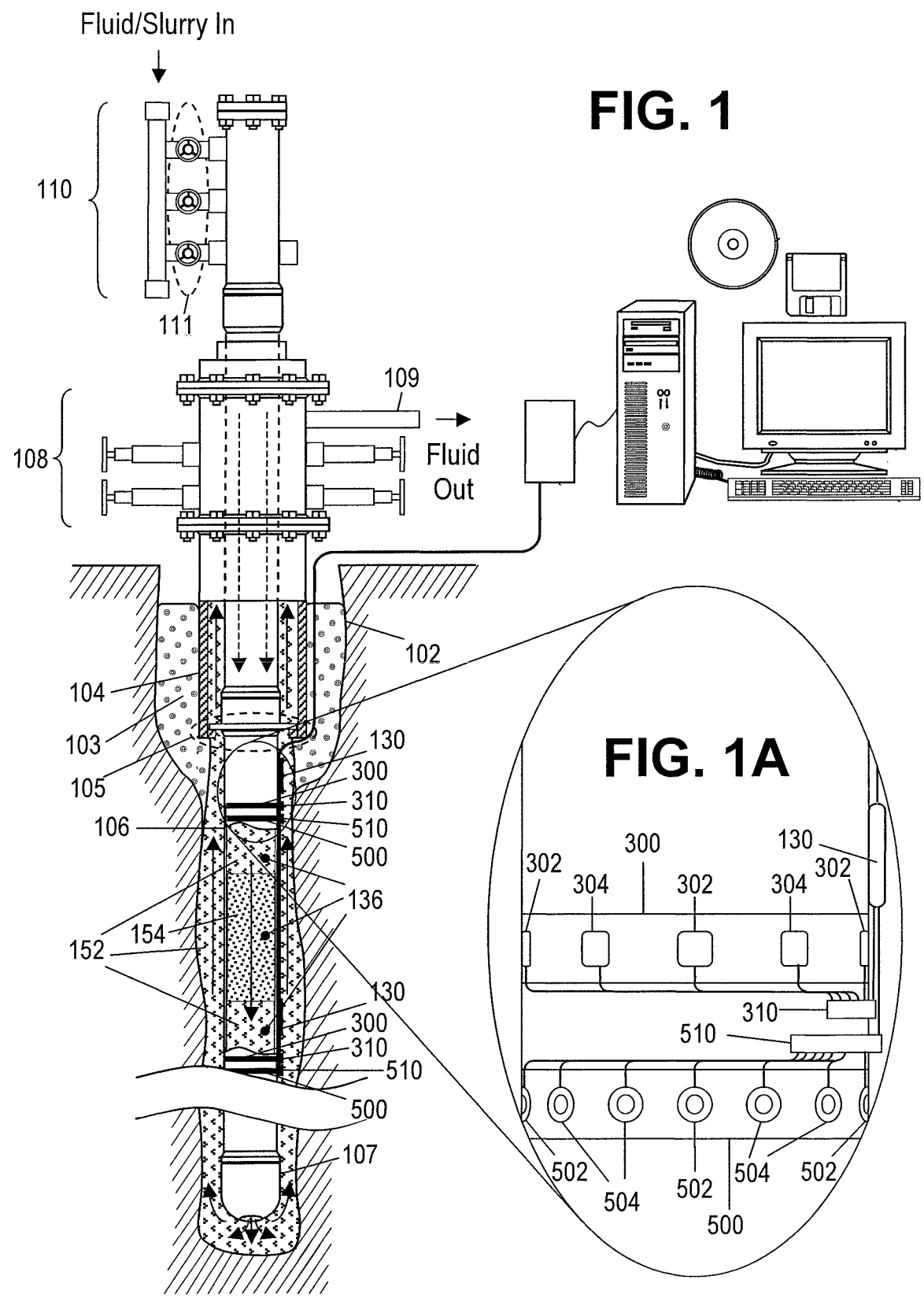
FIG. 1 shows an illustrative cementing operation with a switchable multi-antenna fluid sensing system positioned on a borehole casing.
FIG. 1A shows an enlarged image of illustrative antennas, multiplexers and a sensor tube mounted on the casing of FIG. 1.

The disclosed systems and methods are best understood in the context of the larger systems in which they operate. Accordingly, FIG. 1 shows an illustrative borehole 102 that has been drilled into the earth. Such boreholes are routinely drilled to ten thousand feet or more in depth and can be steered horizontally for perhaps twice that distance. The borehole shown is configured for cementing operations, which as previously noted secures the casing within the borehole. Casing header 104, secured into place before the start of drilling operations by cement 103, provides the anchor point for the other components including casing 106, blowout preventer (BOP) 108 and cementing head 110. Cementing head 110 couples to the top of casing 106, which passes through BOP 108 and is coupled to casing header 104 by casing hanger 105. Casing hanger 105 includes orifices that permit the passage of fluids. Fluids circulated through the borehole, including the cement slurry used to cement the casing into place, are injected into cementing head 110, down through casing 106 and cementing shoe 107 (coupled to the downhole end of casing 106), back up borehole 102 through the annulus between the exterior of casing 106 and the borehole wall, and out return line 109 of BOP 108.

Before cement injection begins, one or more of valves 111 are opened and fluid is injected and circulated through borehole 102 to clear out residual cuttings and other debris. While drilling fluid may initially be used to clear the residual material, spacer fluid 152 is injected to either side of the cement slurry. The spacer fluid is formulated to reduce its intermixing with the cement slurry. Additionally, spacer fluid 152 and cement slurry 154 may sometimes be separated by cementing plugs to further reduce any adverse effect caused by the mixing of spacer fluid with the cement slurry. Such cementing plugs are well known in the industry and not discussed further. Once debris has been cleared by the circulating drilling fluid and spacer fluid has been injected into the casing, cement slurry 154 is injected into cementing head 110, pushing the spacer fluid 152 through casing 106. Once the desired amount of cement slurry 154 is injected, additional spacer fluid 152 is injected above the cement slurry, pushing the cement slurry down the casing, back up the annulus and into position outside the casing 106.

To track the various fluids flowing through the borehole, in at least some illustrative embodiments instruments are positioned along the length of the casing that sense and monitor characteristics of the fluids as they flow by. In the illustrative embodiment of FIG. 1, two sets of RF fluid sensing arrays are affixed to the outside of casing 106, including one set of two radio frequency identification (RFID) antenna arrays 300 and one set of two radio frequency (RF) fluid antenna arrays 500. Each RFID or tag antenna array tracks RFID tags 136 entrained in the flowing fluid, thus enabling the fluid sensing system to monitor fluid characteristics such as the location, flow direction and flow rate of the various fluids as they move through the borehole. Each RF fluid antenna array operates to determine additional characteristics of the flowing fluids (e.g., composition, thickness, etc.) by analyzing reflected EM fields induced by the RF transmit antenna and sensed by the RF receive antenna. Such analysis may include, but is not limited to, identifying changes in the RF signal's magnitude, phase, propagation delay and spectrum, as well as identifying differences in such values between multiple received signals. Many existing RFID tag monitoring and RF fluid sensing techniques known within the art may be used to monitor and sense the characteristics of fluids flowing through and around a casing incorporating the disclosed fluid sensing system, and all such monitoring and sensing techniques are within the scope of the present disclosure.

Antenna arrays 300 and 500 each include several transmit and receive antennas that are selectively enabled to operate as antenna sub-arrays. As shown in FIG. 1A, the tag antenna arrays 300 include transmit antennas 302, each separated from each other by receive antennas 304. Similarly, the fluid antenna arrays 500 include transmit antennas 502, each separated by receive antennas 504. Each sub-array, when operated, includes at least one enabled transmit antenna and one enabled receive antenna. Also, as described in further detail below, a receive antenna may be operated as part of more than one sub-array. The array antennas are spaced around the circumference of the casing 106 so as to sense fluid characteristics in different radial directions within the borehole. In the illustrative embodiment shown in FIGS. 1 and 1A, the placement of the antennas about the casing provides the ability to sense fluid characteristics throughout the full 360 degrees around the casing.

Continuing to refer to FIG. 1A, each antenna within an array couples to an RF multiplexer. Thus, the antennas within a tag antenna array 300 each couple to the de-multiplexed input/output (I/O) interface of a corresponding RF multiplexer 310 and the antennas within a fluid antenna array 500 similarly couple to the de-multiplexed I/O interface of a corresponding RF multiplexer 510. The multiplexed I/O interface of each RF multiplexer couples to a set of RF transceivers and a central processing unit (CPU) encased in a "sensor tube" 130 that acts as a pressure vessel to protect the electronics from the harsh downhole environment. The use of multiplexers in between the electronics within the sensor tube 130 and the antenna arrays reduces the number of RF coaxial cables routed through the end of the sensor tube significantly, thus helping to maintain the diameter of the sensor tube 130 below a size that could otherwise adversely interfere with the flow of the fluids. The use of multiplexers 310 and 510 also reduces the number of transceiver components within the sensor tube 130, which reduces the size, complexity and power requirements of the electronics within the sensor tube.

Figure 2:
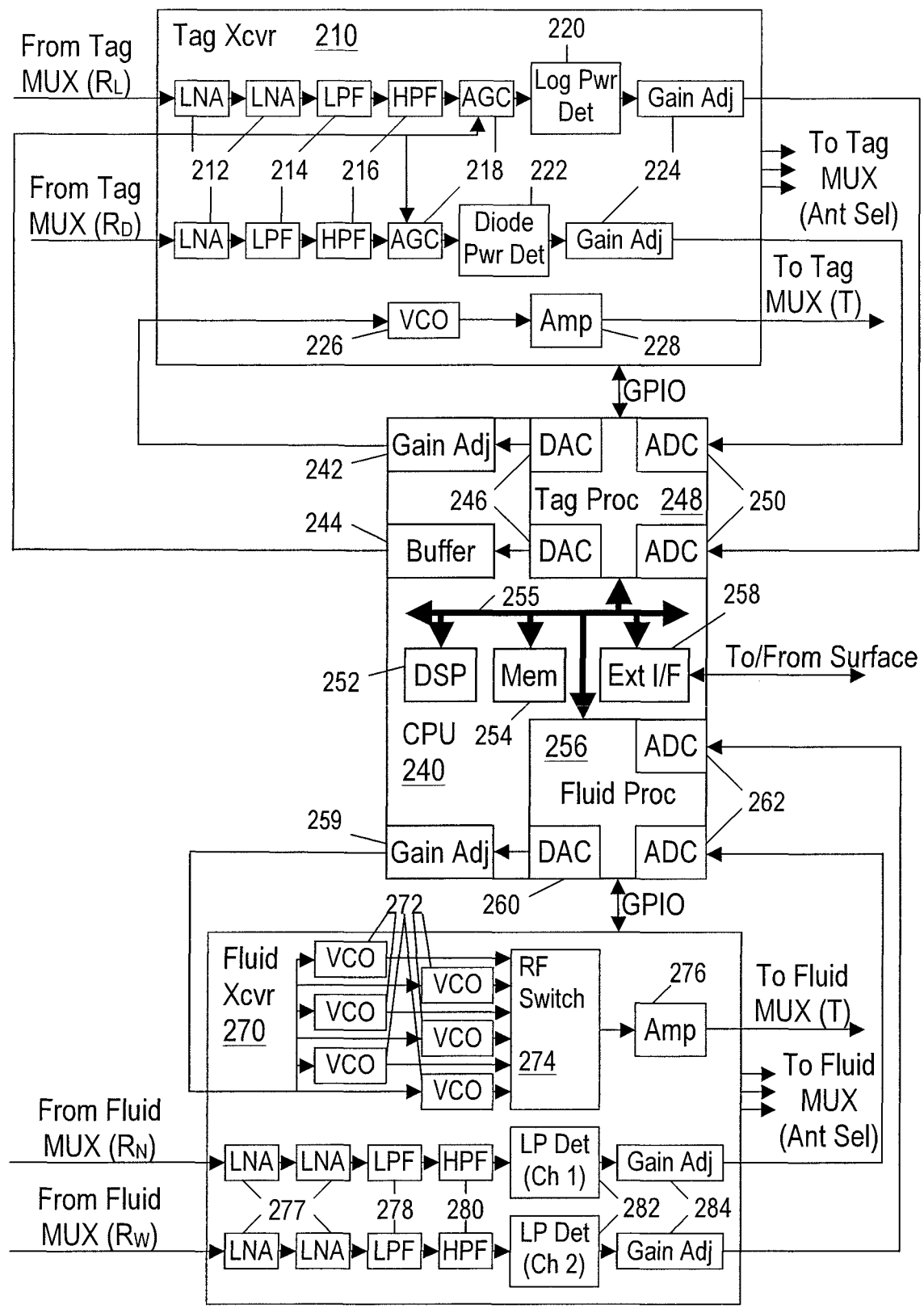
FIG. 2 shows a detailed block diagram of the electronics within an illustrative sensor tube.

FIG. 2 shows a block diagram of an illustrative embodiment of the electronics within sensor tube 130, which includes tag transceiver (Tag Xcvr) 210, CPU 240 and fluid transceiver (Fluid Xcvr) 270. In the embodiment shown CPU 240 includes a tag processor (Tag Proc) 248, a fluid processor (Fluid Proc) 256, a digital signal processor (DSP) 252, memory (Mem) 254 and an external interface (Ext I/F) 258, all coupled to each other through a central bus 255. Although the tag and fluid processors and the DSP of the illustrative embodiment of FIG. 2 are shown as separate processors, in other embodiments the processors may be implemented using one or more cores or DSP modules within a single processor. Further, the tag and fluid processors may be implemented as software modules executing on one or more processors and/or cores. All such CPU variations are within the scope of the present disclosure. Also, memory 254 (used for local data storage by the tag and fluid processors and the DSP) may be implemented using any of a number of known storage technologies, including but not limited to electrically erasable programmable read-only memories (EEPROMs), random access memory (RAM) and flash memories, just to name of few examples. All such storage technologies are also within the scope of the present disclosure.

Continuing to refer to FIG. 2, tag processor 248 initiates a scan cycle to search for a passing RFID tag by selecting the desired RFID transmit and receive antennas and causing tag transceiver 210 to output the antenna select settings for the desired antennas (via the general purpose input/output (GPIO) signals between the CPU 240 and the tag transceiver 210). Once the tag antennas are selected and a settling time interval has passed, the tag processor 248 loads a digital value into the digital-to-analog (DAC) 246 coupled to gain adjust (Gain Adj) 242 so as to cause a desired control voltage to be output by gain adjust 242 within the control voltage range of voltage controlled oscillator (VCO) 226. The control signal is applied to VCO 226 of tag transceiver 210, causing the VCO to output a transmitter signal of a desired RFID transmit frequency range (e.g., 280 MHz-625 MHz). The output of VCO 226 couples to amplifier (Amp) 228, which in turn couples to one of the multiplexed I/O terminals of a tag multiplexer 310 and drives the selected tag transmit antenna 302 within a tag antenna array 300 of FIG. 1A.

If an RFID tag 136 entrained in the fluid (FIG. 1) is within range of a tag antenna array 300, a response signal transmitted by the RFID tag will induce signals on each of two tag antennas 304 and 302. The antennas each couple through an RF multiplexer 310 to one or more low noise amplifiers (LNAs) 212 within tag transceiver 210. The amplified signals then each pass through a low filter (LPF) 214 and a high pass filter (HPF) 216 to narrow the processed signals to specific desired frequency bands. The amplified and filtered signals each pass through an automatic gain control (AGC) stage 218 controlled by tag processor 248 via a DAC 246 and buffer 244. Each signal output by the AGC stages is then presented to one of two detectors. Log power detector (Log Pwr Det) 220 detects the baseband signal and outputs a linear representation of the received signal over a logarithmic scale. Diode power detector (Diode Pwr Det) 222 detects the baseband signal and outputs a representation of the peak value of the received signal. Both detectors are coupled to gain adjustment stages 224 which ensure that the analog signals output by the transceiver are within a desired voltage range before being input to their respective analog-to-digital converters (ADCs) 250 within tag processor 248 for digitizing and processing. In at least some illustrative embodiments additional processing and filtering is provided by DSP 252. The processed signals may be transmitted to the surface via external interface 258 for further processing and/or presentation to a user, or may be stored in memory 254 for later access, processing and/or transmission to the surface. The processing of the signals from the selected tag receive antennas may be analyzed to determine the type of the particular fluid based on the tag ID (e.g., drilling fluid, spacer fluid and/or cement slurry), as well as the fluid location, flow rate and flow direction (e.g., upward around the outside of the casing).

Illustrative fluid processor 256 of FIG. 2 similarly initiates a scan cycle to measure characteristics of a fluid within the borehole by selecting the desired fluid transmit and receive antennas, and by causing fluid transceiver 270 to output the antenna select settings for the desired antennas (via the GPIO signals between the CPU 240 and the fluid transceiver 270). The GPIO signals are also used to select one of the VCOs 272. Once the antennas and VCOs are selected and a settling time interval has passed, the fluid processor 256 loads a digital value into DAC 260, coupled to gain adjust (Gain Adj) 259, so as to cause a desired control voltage to be output and applied to the VCOs 272. The control voltage causes the selected VCO to output a transmitter signal of the desired frequency via VCO RF select switch (RF Switch) 274. The output of the selected VCO is buffered by amplifier (Amp) 276, which couples to one of the multiplexed I/O terminals of a fluid multiplexer 510 and drives the selected fluid transmit antenna 502 within a fluid antenna array 500 of FIG. 1A.

The electromagnetic (EM) field emitted by the selected fluid transmit antenna 502 propagates through the fluid and the surrounding formation, causing EM fields to be reflected at the various material boundaries (e.g., the fluid/formation boundary). These reflected EM fields propagate back towards fluid antenna array 500 where the fields are detected by receive antennas 504. The EM signals received by the selected antennas are routed through fluid multiplexer 510 back to low noise amplifiers 277 within fluid transceiver 270 of FIG. 2. The amplified signals then each pass through a low filter (LPF) 278 and a high pass filter (HPF) 280 to narrow the processed signals to specific desired frequency bands. In the illustrative embodiment of FIG. 2, one of the filter sets (filtering receive signal $R_N$) is configured for a frequency band narrower than that of the other filter set (filtering receive signal $R_W$). The amplified and filtered signals are then presented to one of two logarithmic power detectors 282, which each detects the baseband signal and outputs a linear representation of their respective signals over a logarithmic scale.

Both detectors 282 are coupled to gain adjustment stages 284 which ensure that the analog signals output by the transceiver are within a desired voltage range before being input to their respective ADCs 262 within fluid processor 256 for digitizing and processing. In at least some illustrative embodiments additional processing and filtering is provided by DSP 252. As with the processed tag antenna signals, the processed fluid antenna signals may be transmitted to the surface via external interface 258 for further processing and/or presentation to a user, or may be stored in memory 254 for later access, processing and/or transmission to the surface. The processing of the signals from the selected fluid receive antennas may be analyzed to determine, for example, changes in magnitude, phase, spectral distribution, interference patterns and overall wave shape relative to the originally transmitted signal, or as between the narrow and wide band signals. This processing may be used either alone or together with other data to determine characteristics of the fluid such as composition, density and thickness, just to name a few examples. Other signal characteristics and processing methods suitable for use with the disclosed embodiments, as well as other fluid features identifiable through the application of such processing methods to the disclosed signals, may become apparent to those of ordinary skill in the art, and all such signal characteristics, processing methods and fluid features are within the scope of the present disclosure.

Figure 3:
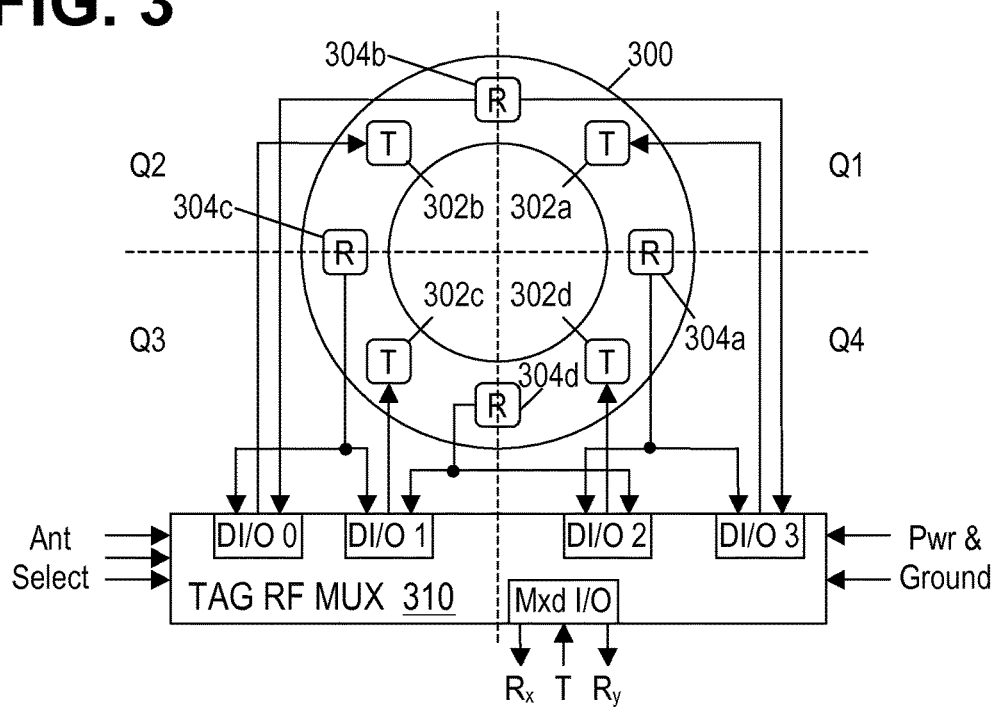
FIG. 3 shows an illustrative tag antenna switch and array configuration.

As previously described, transmit and receive antennas are positioned around the circumference of antenna arrays 300 and 500 and mounted on casing 106. The antennas within each array are selectively operated as sub-arrays to transmit and receive signals to and from different radial directions. In at least some illustrative embodiments, this configuration enables full 360 degree sensing around the casing 106. FIG. 3 shows an example of such an illustrative embodiment for a tag antenna array 300 that includes four tag transmit antennas (T) 302 (302a-302d) and four tag receive antennas (R) 304. Each tag transmit antenna couples to a different de-multiplexed I/O port (DI/O 0 through DI/O 3) of tag RF multiplexer (Tag RF MUX) 310, enabling the selection of a transmit antenna 302 oriented in a specific radial direction. In the example shown the transmit antennas are spaced about the tag antenna array (and therefore about the casing 106 as shown in FIG. 1A) at 90 degree intervals, thus defining four transmit/receive quadrants Q1 through Q4. Each quadrant spans a region covering at least 45 degrees to either side of the normal to a corresponding tag transmit antennas 302, and different regions may overlap each other.

Continuing to refer to the illustrative embodiment of FIG. 3, when a particular tag transmit antenna 302 is selected by tag RF multiplexer 310 the tag receive antennas 304 (304a-304d) to either side of the transmit antenna are also selected. The selected transmit and receive antennas all couple to tag transceiver 210 of FIG. 2 via the tag RF multiplexer 310 multiplexed I/O port (Muxd I/O). The receive signal from the antenna located on the x-axis of FIG. 3 is referred to as the $R_x$ signal and the receive signal from the antenna located on the y-axis of FIG. 3 is referred to as the $R_y$ signal. Each antenna receives a signal emitted by an RFID tag entrained in the fluid passing by the antennas. For each quadrant being selected, the transmit antenna radiates EM fields into the formation and the two receive antennas capture the reflected EM fields and send them to the transceiver 210 of FIG. 2 as receive signals $R_x$ and $R_y$. The $R_x$ and $R_y$ receive signals have different characteristics when RFID tags pass by each quadrant. The RF coaxial cables (e.g., RG-58, 50-ohm) are used to interconnect the tag antennas, the tag multiplexer 310 of FIG. 2 and the tag transceiver 210 of FIG. 2.

Figure 4A:
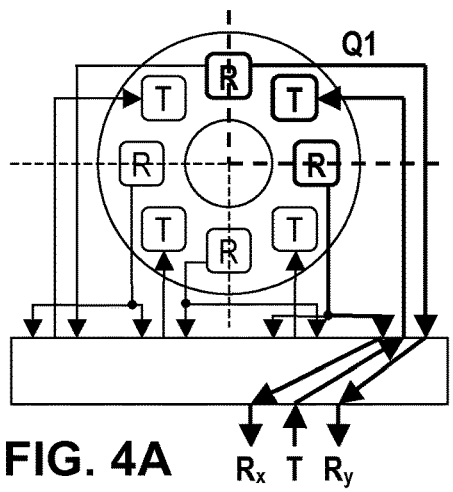
FIGS. 4A-4D show an illustrative tag antenna array switching sequence.
Figure 4B:
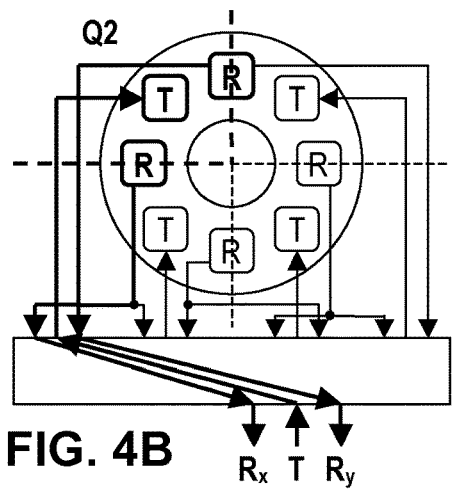

FIGS. 4A through 4D show how the illustrative tag multiplexer 310 of FIG. 3 is sequenced to provide full 360 degree RFID tag sensing about the tag antenna array 300. FIG. 4A shows the tag RF multiplexer 310 of FIG. 3 configured to select transmit antenna 302a and receive antennas 304a and 304b (via de-multiplexed I/O port 3), thus enabling the antenna sub-array formed by these individual antennas (bolded in the figure for emphasis) to trigger and sense an RFID tag passing by the antennas within quadrant Q1 via the associated RF pathways (also shown bolded). Once the transmit/receive sequence for triggering the transmit signal and sensing and sampling of the received signals has been completed by the CPU 240 of FIG. 2, assuming that the time required to capture and sample the signal is significantly larger than the settling time of the RF multiplexer 310, the tag RF multiplexer 310 is sequenced to the next de-multiplexed port. In the example of FIG. 4B, tag transmit antenna 302b and tag receive antennas 304b and 304c are next selected (via de-multiplexed I/O port 0), providing RFID tag triggering and sensing coverage within quadrant Q2 by the antenna sub-array formed by the selected antennas.

Figure 4C:
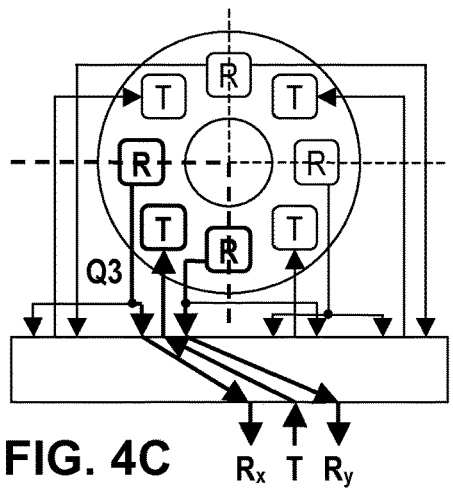
Figure 4D:
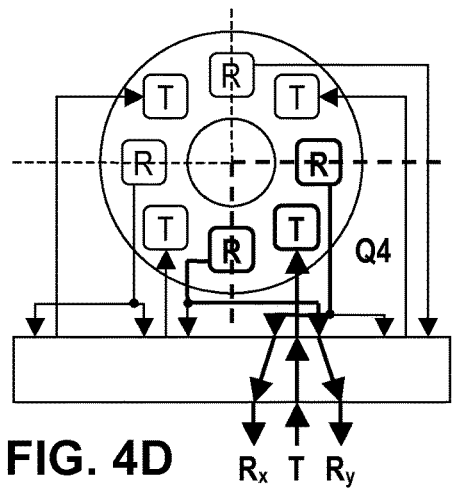

FIGS. 4C and 4D respectively show the sequential selection of the antenna sub-arrays formed by transmit antenna 302c and receive antennas 304c and 304d (via de-multiplexed I/O port 1) to monitor quadrant Q3, and the selection of the antenna sub-array formed by transmit antenna 302d and receive antennas 304d and 304a (via de-multiplexed I/O port 2) to monitor quadrant Q4. It should be noted that although the illustrative embodiment of FIGS. 4A through 4D selects three out of eight antennas sequentially in counterclockwise order to define four equally spaced sub-arrays, each within one of four quadrants or (more generally) regions, other sequences, orders, spacing and numbers of antennas, regions and sub-arrays will become apparent to those of ordinary skill in the art, and all such sequences, orders, spacing and numbers of antennas, regions and sub-arrays are within the scope of the present disclosure.

The fluid antenna array 500 shown in FIG. 5 is configured and operates in a manner similar to the tag antenna array 300 of FIG. 3. Fluid antenna array 500 includes four fluid transmit antennas (T) 502 (502a-502d) and eight fluid receive antennas 504 (504a-504h) that include four narrow band receive antennas ($R_N$) and four wide band receive antennas ($R_W$). Each fluid transmit antenna couples to a different de-multiplexed I/O port of fluid multiplexer (Fluid RF MUX) 510, enabling the selection of a transmit antenna 502 oriented in a specific radial direction. Like the tag antennas of FIG. 3, the fluid transmit antennas are spaced about the fluid antenna array and casing 106 at 90 degree intervals, defining four transmit/receive quadrants Q1 through Q4. Each quadrant spans a region covering at least 45 degrees to either side of the normal to a corresponding fluid transmit antenna 502, and different regions may overlap each other.

Continuing to refer to the illustrative embodiment of FIG. 5, when a particular fluid transmit antenna 502 is selected by fluid RF multiplexer 510 the fluid receive antennas 504 (504a-504h) to either side of the transmit antenna (one narrow band, one wide band) are also selected. The selected transmit and receive antennas all coupled to fluid transceiver 270 of FIG. 2 via the fluid RF multiplexer 510 multiplexed I/O port. Each fluid receive antenna 504 receives reflections of the transmit signal (e.g., from the fluid/borehole wall boundary) and each couples to a dedicated de-multiplexer I/O port of fluid multiplexer 510. As with the tag antenna array, RF coaxial cables (e.g., RG-58) are used to connect the fluid antennas, fluid RF multiplexer 510 and fluid transceiver 270 of FIG. 2 to each other. The cables further operate to maintain the required impedance along all RF signal pathways (e.g., 50 Ohms). Unlike the tag antenna array 300 of FIG. 3, the illustrative fluid antenna array 500 of FIG. 5 uses dedicated antennas within each antenna sub-array defined by the antennas selection of fluid RF multiplexer 510, with each sub-array being operated at a different time.

FIGS. 6A through 6D show how the illustrative fluid multiplexer 510 of FIG. 5 is sequenced to provide full 360 degree fluid sensing about the fluid antenna array 500. FIG. 6A shows the fluid RF multiplexer 510 of FIG. 5 configured to select transmit antenna 502a and receive antennas 504a and 504b (via de-multiplexed I/O port 2), thus enabling the antenna sub-array formed by these individual antennas (bolded in the figure for emphasis) to generate the source signal and receive reflected signals present within quadrant Q1 via the associated RF pathways (also bolded). Once the transmit/receive sequence for generating the source signal and the sensing and sampling of the received reflected signals by CPU 240 of FIG. 2 has been completed, assuming that the time required to capture and sample the signal is significantly larger than the settling time of the RF multiplexer 510, the fluid RF multiplexer is sequenced to the next de-multiplexed port. In the example of FIG. 6B, fluid transmit antenna 502b and fluid receive antennas 504c and 504d are next selected (via de-multiplexed I/O port 3), providing fluid sensing signal generation and sensing coverage within quadrant Q2 by the antenna sub-array formed by the selected antennas.

FIGS. 6C and 6D respectively show the sequential selection of the antenna sub-arrays formed by transmit antenna 502c and receive antennas 504e and 504f (via de-multiplexed I/O port 0) to monitor quadrant Q3, and the selection of the antenna sub-array formed by transmit antenna 502d and receive antennas 504g and 504h (vial de-multiplexed I/O port 1) to monitor quadrant Q4. It should be noted that although the illustrative embodiment of FIGS. 4A through 4D selects three out of twelve antennas sequentially in counterclockwise order to define four equally spaced sub-arrays, each within one of four quadrants or (more generally) regions, other sequences, orders, spacing and numbers of antennas, regions and sub-arrays will become apparent to those of ordinary skill in the art, and all such sequences, orders, spacing and numbers of antennas, regions and sub-arrays are within the scope of the present disclosure.

By configuring and operating the disclosed RF multiplexers as described, the total number of RF cables needed to couple the antennas to their corresponding transceivers and to the CPU, and thus through the end of the sensor tube containing the transceivers and CPU, is reduced as compared to the number of RF coaxial cables needed without multiplexers. For example, for a system that includes a single tag antenna array 300 and a single fluid array 500 such as those shown in the illustrative embodiments of FIGS. 3 and 5, the RF coaxial cable count is reduced from 20 (8 tag RF coaxial cables and 12 fluid RF coaxial cables) to 6 (3 tag RF coaxial cables and 3 fluid RF coaxial cables). The use of the disclosed RF multiplexer configuration thus allows for downhole antenna configurations that might otherwise be impractical or unfeasible, given existing limitations on the diameter of sensor tubes suitable for use within a given downhole operation (e.g., cementing, production, drilling, fracturing, etc.).

Further, the use of additional multiplexers can allow for even more complex configurations such as, for example, the use of multiple arrays for sensing at multiple locations along the length of the tubular upon which the arrays are mounted. For example, the system shown in FIG. 1 includes two tag antenna arrays 300 and two fluid antennas arrays 500.

Additional multiplexers may be added to further multiplex the outputs of two tag multiplexers 310 and similarly multiplex the outputs of the two fluid multiplexers 510, thus keeping the final RF coaxial cable count to the desired reduced count (e.g., 6 coaxial cables for the illustrative embodiment of FIG. 1 instead of 40). While this may require additional antenna select conductors, these generally utilize conductors of a much smaller diameter than the RF coaxial cables, and at least some additional select lines can be accommodated within the diameter of existing sensor tubes. Additionally, although the disclosed embodiments show the use of separate antenna select lines independently controlled by each processor within the CPU 240 of FIG. 2, in other illustrative embodiments a single set of antenna select lines may be used to further reduce the overall conductor count exiting the end of the sensor tube, wherein the tag and fluid processors sample their respective received signals in synchronization. Other more complex multiplexing and antenna selection configurations and combinations may become apparent to those of ordinary skill in the art, and all such configurations and combinations are within the scope of the present disclosure.

Figure 7:
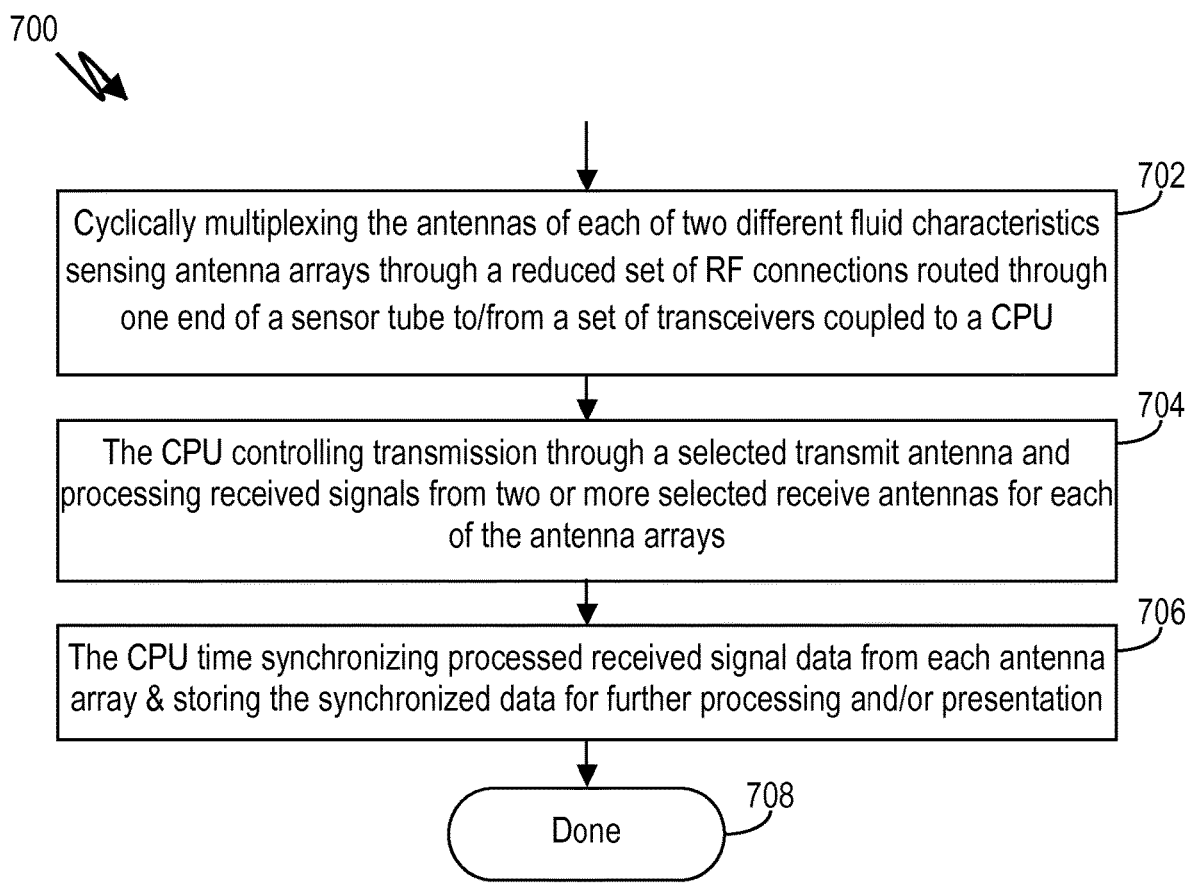
FIG. 7 shows an illustrative method for operating a switchable multi-antenna fluid sensing system.

The selection of antennas through the use of the disclosed multiplexers may be implemented in software executing on either or both of the processors of the CPU 240 of FIG. 2, or any other similar processing element included within an embodiment of the CPU. FIG. 7 shows an illustrative method 700 that may be implemented by such software for controlling the multiplexing and the overall operations of the disclosed tubular-mounted switchable multi-antenna fluid sensing system. The method begins by cyclically multiplexing the antennas of each of two different antenna arrays, each array designed to sense at least one fluid characteristic not sensed by another array within the illustrative sensing system (block 702). The antennas are switched by multiplexers to a reduced set of RF cables that route RF signals to/from one of a set of transceivers and a CPU through one end of a sensor tube containing the transceivers and CPU. The reduced number of RF cables is relative to the number of RF cables that would be required if the antennas were coupled to the transceivers and/or CPU without the multiplexers. The CPU controls the transmission of signals through the selected transmit antenna and processes any received signals from two or more selected received antennas that result from the transmitted signal for each of the antenna arrays (block 704). The CPU then time synchronizes the processed received signal data from each array and stores the data for further processing, transmission to a surface system and/or presentation to a user of the system (block 706), ending the method (block 708).

Numerous other modifications, equivalents, and alternatives, will become apparent to those skilled in the art once the above disclosure is fully appreciated. For example although the embodiments described are presented within the context of a well casing during cementing operations along the exterior of the casing, the described switchable multi-antenna fluid sensing systems may be deployed either inside or outside such a casing to monitor fluids flowing through and around the casing. Further, such a switchable multi-antenna fluid sensing system may be mounted on either the interior or exterior of any of a variety of tubulars through and/or around which fluids flow. These may include, but are not limited to, drilling pipe, bottom hole assemblies (BHAs), logging while drilling (LWD) downhole tools, measurement while drilling (MWD) downhole tools and production tubing, just to name a few examples. Additionally, other fluids beyond those described here may be monitored by the disclosed systems, including by not limited to produced hydrocarbons, water, gravel pack and fracturing fluid. It is intended that the following claims be interpreted to embrace all such modifications, equivalents, and alternatives where applicable.

What is claimed is:

1. A tubular-mounted switchable multi-antenna fluid sensing system that comprises:
    at least two antenna arrays that each senses at least one fluid characteristic not sensed by any other of the at least two antenna arrays, wherein each antenna array comprises at least two antenna sub-arrays and each antenna sub-array comprises at least one receive antenna and a transmit antenna with a radial transmission direction about the tubular axis different from the transmission direction of at least one other antenna sub-array transmit antenna within a given antenna array;
    at least two radio frequency (RF) multiplexers, each RF multiplexer coupled via its de-multiplexed input/output (I/O) interface (I/F) to each antenna within a corresponding antenna array of the at least two antenna arrays; and
    a sensor tube comprising:
        at least two RF transceivers each RF transceiver coupled to a corresponding RF multiplexer's multiplexed I/O I/F; and
        a central processing unit (CPU) coupled to each of the at least two RF transceivers wherein the CPU controls transmission of signals by, and processes fluid sense signals received from, the at least two antenna arrays;
    wherein RF cables that couple the at least two RF transceivers to their corresponding RF multiplexers are grouped together and routed into one end of the sensor tube, and
    wherein the CPU causes the RF multiplexers to periodically couple each antenna sub-array to its corresponding RF transceiver and further stores data representing fluid sense signals received from each antenna sub-array for transmission or further processing and presentation.

2. The system of claim 1, wherein the at least one fluid characteristic comprises a fluid characteristic selected from the group consisting of flow rate, flow direction, type, composition, thickness, density, location, and presence.

3. The system of claim 1, wherein a tubular to which the system is mounted comprises a downhole tubular selected from the group consisting of a well casing, a production tubing, a drill pipe, a logging while drilling tool, a measurement while drilling tool and a bottom hole assembly.

4. The system of claim 1, wherein a fluid being sensed by the system comprises a fluid selected from the group consisting of spacer fluid, cement slurry, drilling fluid, produced hydrocarbons, water, gravel pack and fracturing fluid.

5. The system of claim 1, wherein one of the at least two antenna arrays comprises a plurality of radio frequency identification (RFID) antenna sub-arrays.

6. The system of claim 1, wherein one of the at least two antenna arrays comprises a plurality of fluid antenna sub-arrays.

7. The system of claim 1, wherein at least one antenna is included within more than one sub-array.

8. A downhole fluid sensing system that comprises:
    a downhole tubular;
    a surface processing system; and a downhole switchable multi-antenna fluid sensing system mounted on the tubular and coupled to the surface processing system, wherein the switchable multi-antenna fluid sensing comprises:
- at least two antenna arrays that each senses at least one fluid characteristic not sensed by any other of the at least two antenna arrays, wherein each antenna array comprises at least two antenna sub-arrays and each antenna sub-array comprises at least one receive antenna and a transmit antenna with a radial transmission direction about the tubular axis different from the transmission direction of any other antenna sub-array transmit antenna within a given antenna array;
- at least two radio frequency (RF) multiplexers, each RF multiplexer coupled via its de-multiplexed input/output (I/O) interface (I/F) to each antenna within a corresponding antenna array of the at least two antenna arrays; and
- a sensor tube comprising:
  - at least two RF transceivers each RF transceiver coupled to a corresponding RF multiplexer's multiplexed I/O I/F; and
  - a central processing unit (CPU) coupled to each of the at least two RF transceivers wherein the CPU controls transmission of signals by, and processes fluid sense signals received from, the at least two antenna arrays;
- wherein RF cables that couple the at least two RF transceivers to their corresponding RF multiplexers are grouped together and routed into one end of the sensor tube, and
- wherein the CPU causes the RF multiplexers to periodically couple each antenna sub-array to its corresponding RF transceiver and further sends to the surface system data representing fluid sense signals received from each antenna sub-array for further processing and presentation.

9. The system of claim 8, wherein the at least one fluid characteristic comprises a fluid characteristic selected from the group consisting of flow rate, flow direction, type, composition, thickness, density, location, and presence.

10. The system of claim 8, wherein the tubular comprises a downhole tubular selected from the group consisting of a well casing, a production tubing, a drill pipe, a logging while drilling tool, a measurement while drilling tool and a bottom hole assembly (BHA).

11. The system of claim 8, wherein a fluid being sensed by the system comprises a fluid selected from the group consisting of spacer fluid, cement slurry, drilling fluid, produced hydrocarbons, water, gravel pack and fracturing fluid.

12. The system of claim 8, wherein one of the at least two antenna arrays comprises a plurality of radio frequency identification (RFID) antenna sub-arrays.

13. The system of claim 8, wherein one of the at least two antenna arrays comprises a plurality of fluid antenna sub-arrays.

14. A multi-antenna fluid sensing switching method, comprising:
- sensing a plurality of fluid characteristics using at least two tubular mounted antenna arrays, each antenna array sensing at least one fluid characteristic not sensed by any other of the at least two tubular mounted antenna arrays;
- switching between two or more antenna sub-arrays within each of the at least two antenna arrays to periodically couple each antenna sub-array to a central processing unit (CPU) housed within a tubular mounted sensor tube;
- providing multiplexed antenna sub-array radio frequency (RF) signals to or from the CPU using RF cables routed into one end of the sensor tube;
- the CPU controlling transmission by, and processing fluid sense signals received from, each coupled antenna sub-array; and
- the CPU time-synchronizing the sense signal data received from each of the two antenna arrays and storing the time-synchronized sense signal data for further processing and presentation.

15. The method of claim 14, wherein the plurality of fluid characteristics comprises a fluid characteristic selected from the group consisting of flow rate, flow direction, type, composition, thickness, density, location, and presence.

16. The method of claim 14, wherein a tubular to which the antenna arrays and sensor tube are mounted comprises a downhole tubular selected from the group consisting of a well casing, a production tubing, a drill pipe, a logging while drilling tool, a measurement while drilling tool and a bottom hole assembly (BHA).

17. The method of claim 14, wherein a fluid being sensed by the system comprises a fluid selected from the group consisting of spacer fluid, cement slurry, drilling fluid, produced hydrocarbons, water, gravel pack and fracturing fluid.

18. The method of claim 14, wherein the sense signal data comprises radio frequency identification (RFID) data.

19. The method of claim 14, wherein the sense signal data comprises data representative of an electromagnetic field induced within the fluid by one of the at least two tubular mounted antenna arrays.

20. The method of claim 14, further comprising transmitting the time-synchronized sense signal data to a surface system for further processing and presentation.

* * * * *